Oct. 15, 1929. J. EDGAR 1,731,481
METHOD OF AND MACHINE FOR RELIEVING CUTTERS
Filed July 26, 1924 10 Sheets-Sheet 1

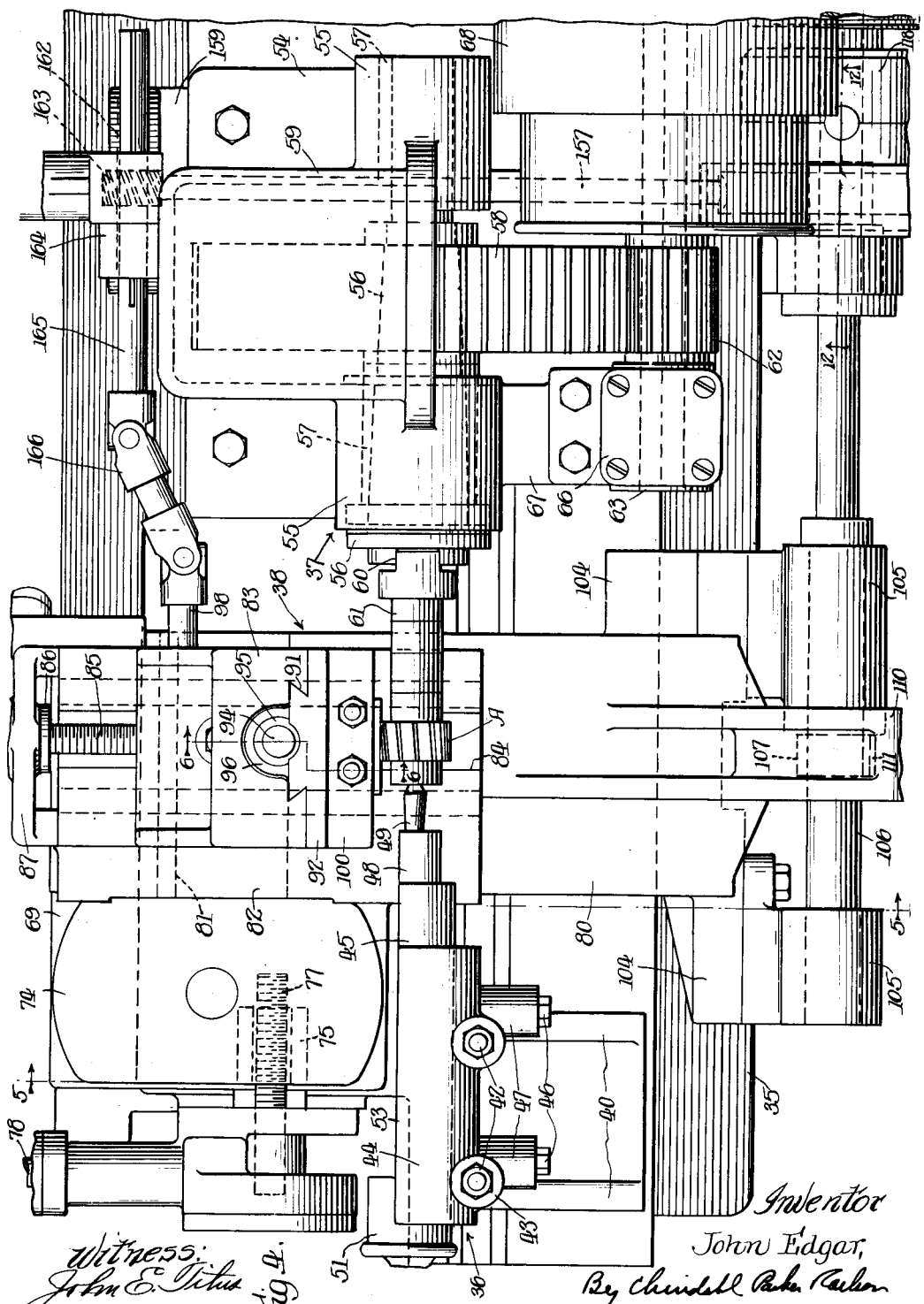

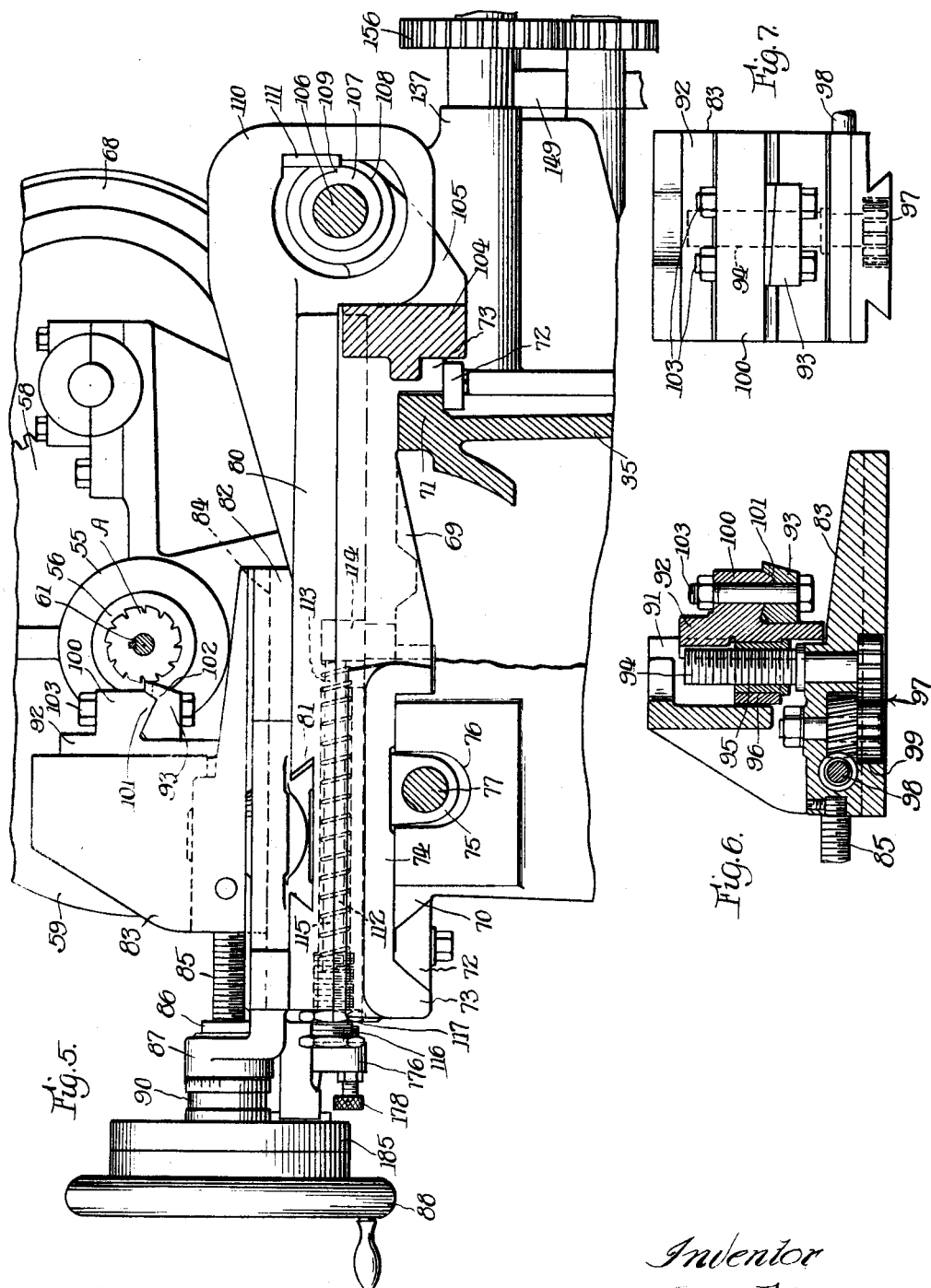

Oct. 15, 1929.  J. EDGAR  1,731,481
METHOD OF AND MACHINE FOR RELIEVING CUTTERS
Filed July 26, 1924  10 Sheets-Sheet 6
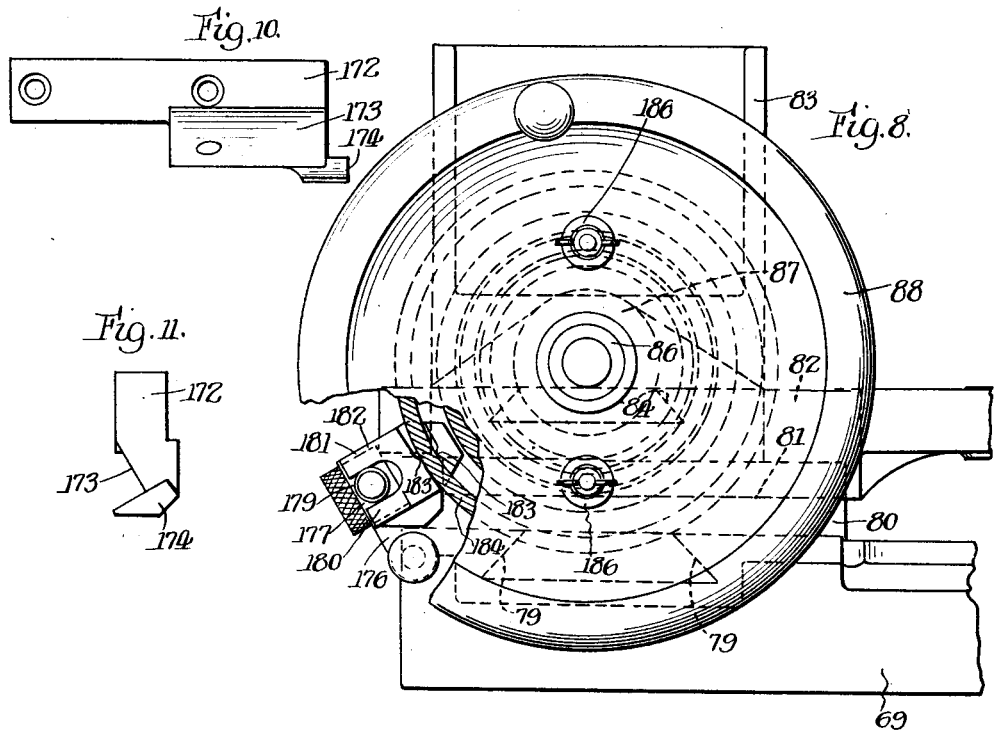
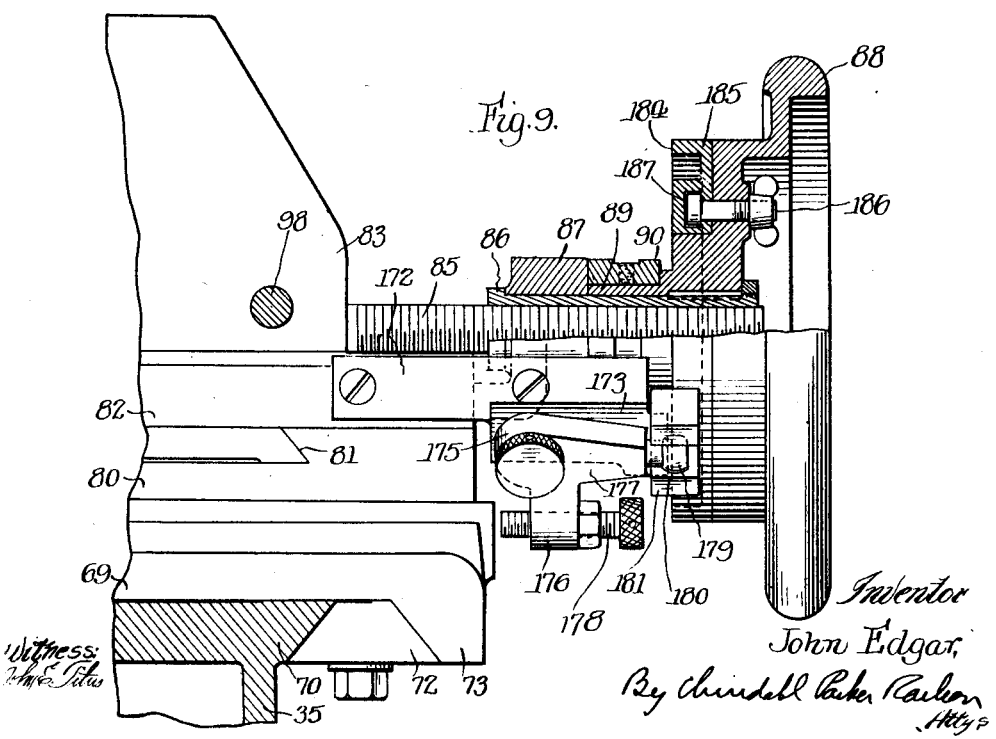

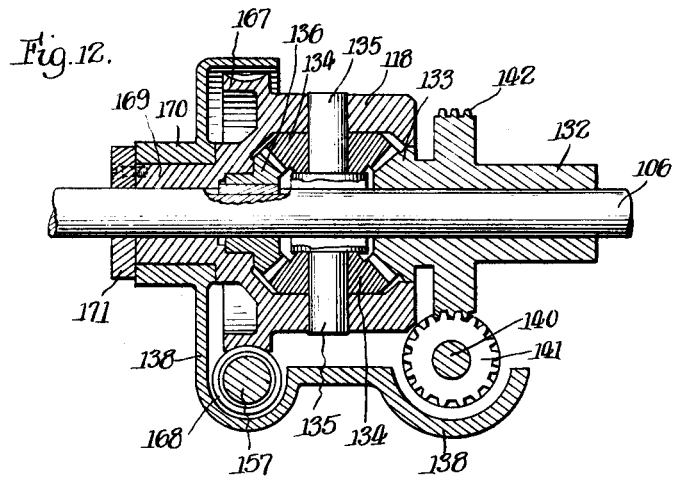

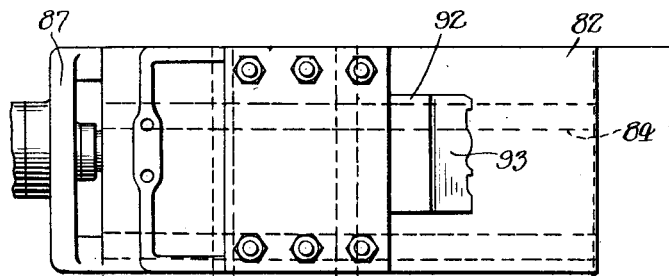
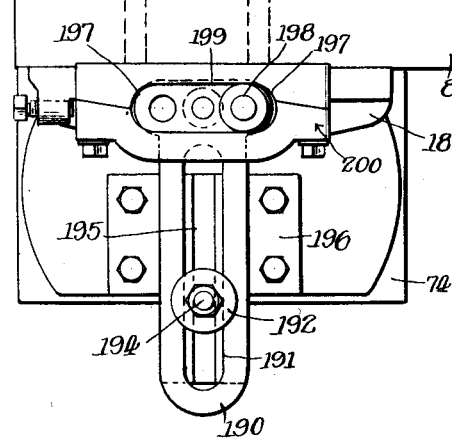
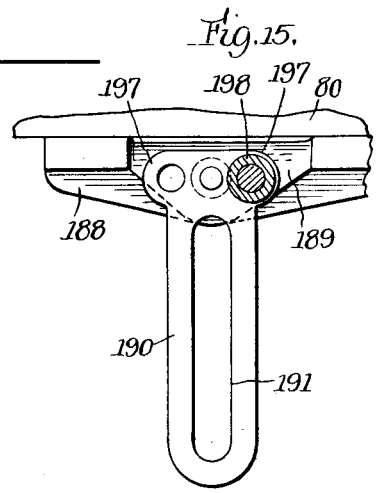
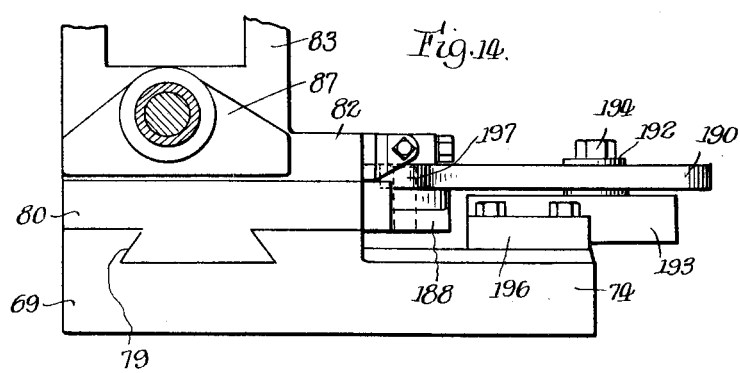

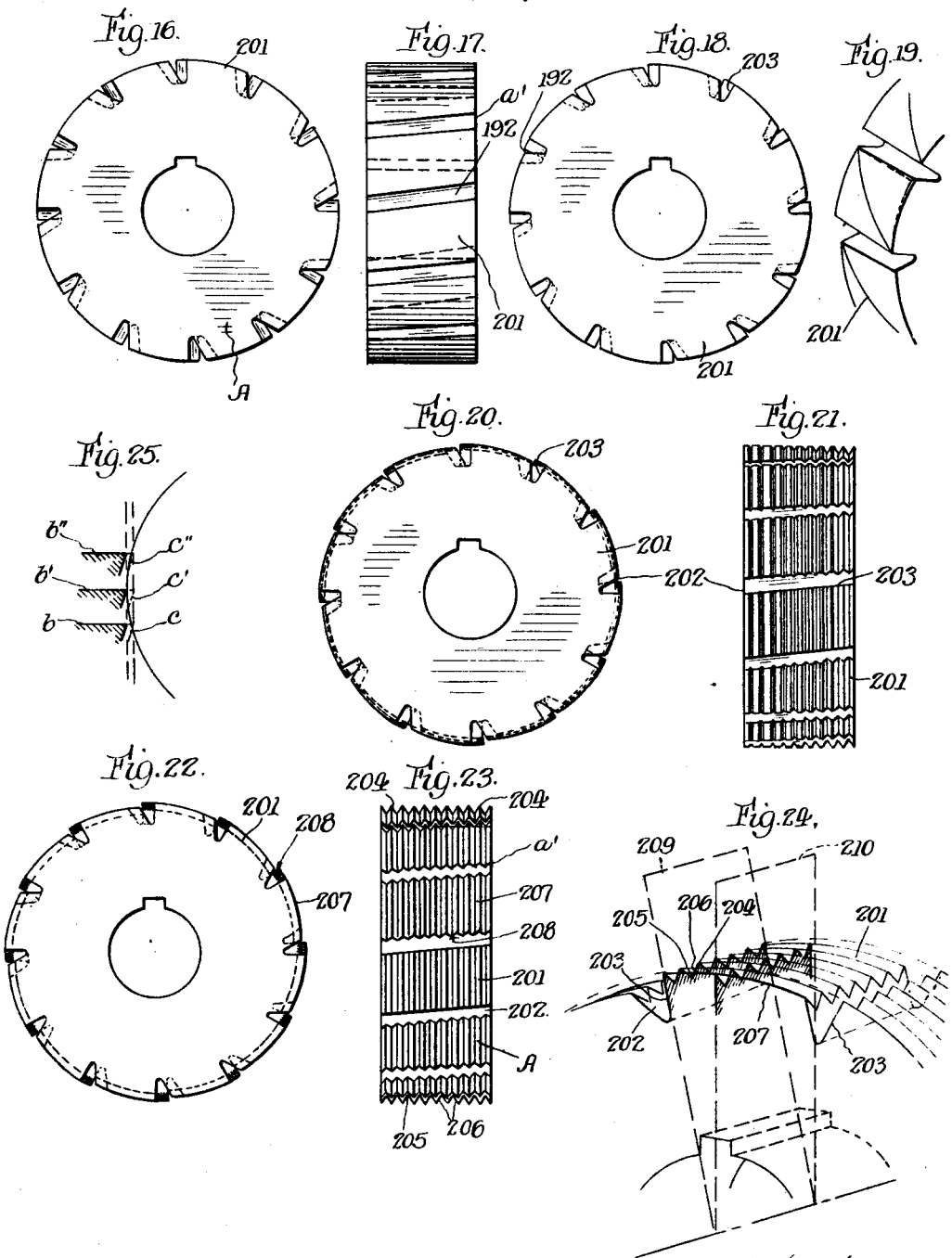

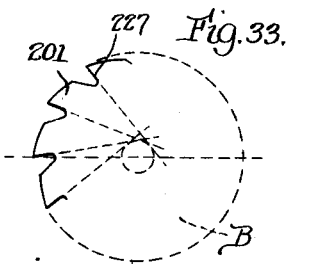
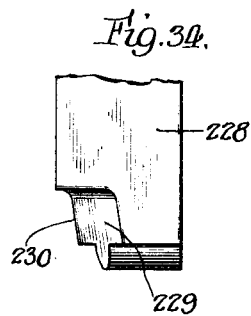
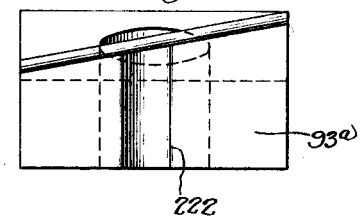
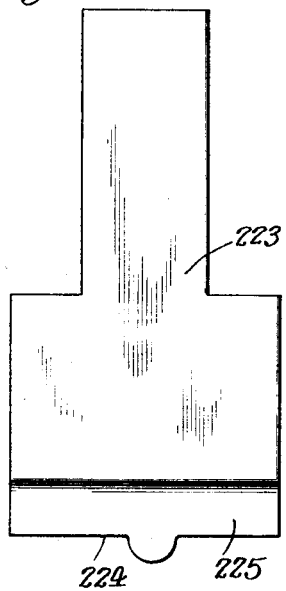
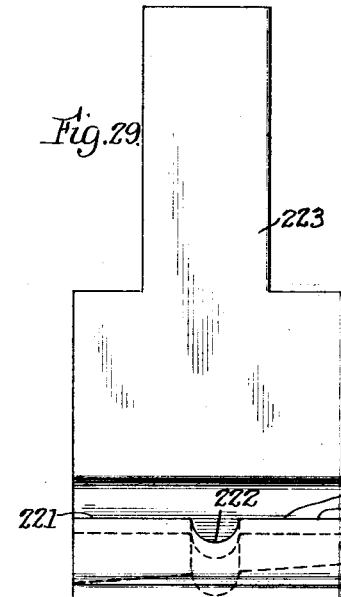
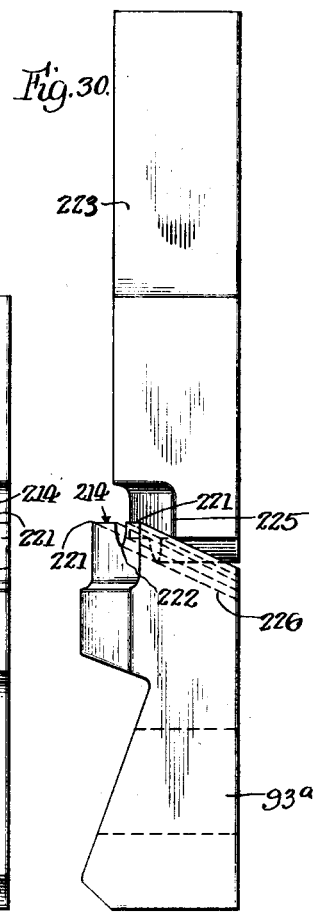

Patented Oct. 15, 1929

1,731,481

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

METHOD OF AND MACHINE FOR RELIEVING CUTTERS

Application filed July 26, 1924. Serial No. 728,353.

My invention relates generally to an improved method of and machine for forming and relieving cutters, particularly contour or formed milling cutters, that is to say cutters adapted to cut a predetermined contour other than a straight line.

In cutting tools adapted for hard materials, it is desirable that the cutting edges of the tool should be longitudinally inclined with respect to the axis so as to effect a gradual engagement with the work and a shearing cut, thereby obtaining an improved cutting action, and avoiding the heavy shocks which result when the engagement is sudden and intermittent. To provide for a long period of usefulness, it is further desirable that the tool should be so relieved or backed-off that the cutting faces of the teeth can be ground repeatedly until a bare skeleton of the original mass remains without changing the effective contour of the cutting edges. Heretofore it has been exceedingly difficult to accurately make formed or contour cutters having helical, spiral, or inclined teeth; and particularly to properly relieve such teeth so that they could be resharpened without changing their effective contour.

The primary object of the present invention therefore is to provide an improved method of relieving and a backing-off lathe for many different types of cutters, but particularly contour milling cutters having either straight or inclined teeth with either radial or undercut front faces and cutting edges of any desired contour, the relief to be generated being such that the teeth can be resharpened without altering their effective contour.

A further object is to provide a backing-off lathe which can be adapted at the option of the manipulator to form the teeth of the milling cutter with either a rectilinear or an oblique relief; and which more specifically comprises a side relief attachment operable by the reciprocation of the lathe tool toward and from the cutter blank to synchronously reciprocate said tool transversely of said blank whereby said lathe tool is given a composite movement in a direction inclined with respect to the axis of blank.

Prior to my invention, complicated methods and means were employed in backing off formed milling cutters having spiral gashes. For short blanks with underlapping teeth, a special lathe tool of complex design having a warped contour adapted to cut the predetermined contour on the cutter blank was used. For overlapping teeth, however, it was necessary to use a templet pin or some other narrow lathe tool which was fed in intermittent steps along the work blank by means of an involved mechanical movement, and was guided in such movement by a suitably shaped former. Another object of this invention therefore is to provide an improved backing-off lathe operating on a simple and novel method, in which an inexpensive and easily constructed lathe tool, having a contour of substantially the same width and character as the predetermined contour can be adapted to relieve teeth of any desired form, inclination, or length.

Still another object is to provide an improved method of backing-off contour milling cutters having spiral or inclined grooves, which method consists in rotating the cutter blank, in reciprocating the lathe tool in timed relation to the rotation of the blank, in feeding the lathe tool first directly toward the blank to obtain the desired cutting depth, and then in a direction perpendicular to this movement transversely of said blank, and varying the reciprocation of the lathe tool during the last feeding movement to compensate for the inclination of the cutter grooves.

A further object is to provide a backing-off lathe, simple in construction and operation, whereby the above method can be efficiently and expeditiously carried out.

Another object is to provide a novel feeding means operable by the reciprocating tool slide to automatically advance the lathe tool toward the cutter blank.

A further object is to provide an improved means for advancing or retarding the reciprocation of the lathe tool relative to the rotation of the cutter blank to compensate for the inclination of the teeth.

Another object resides in the character and novel arrangement of the machine units for effecting the above mentioned movements, said units being compactly associated, driven from a single source of power, and relatively adjustable to adapt them to form and relieve cutters having teeth of different inclinations, depths, and widths.

A further object is to provide a backing-off lathe which by a mere change of the lathe tool is capable of cutting either radial or undercut teeth.

Ancillary objects and advantages will become apparent as the description proceeds.

In the drawings, Fig. 1 is a rear side view of a backing-off lathe embodying the features of my invention.

Fig. 4 is a plan view.

Fig. 5 is a vertical section taken along the line 5—5 of Fig. 4.

Fig. 6 is a vertical section of the tool holder and tool adjusting slide taken along the line 6—6 of Fig. 4.

Fig. 7 is a rear view of the construction shown in Fig. 6.

Fig. 8 is a fragmentary front view of the cutting mechanism.

Fig. 9 is a fragmentary side view partially in section of the cutting mechanism.

Figs. 10 and 11 are side and end views respectively of the plate for supporting part of the automatic cross feed mechanism.

Fig. 12 is a vertical section of the differential mechanism taken in the plane of line 12—12 of Fig. 4.

Fig. 13 is a fragmentary plan view of the side relief attachment.

Fig. 14 is a front view thereof.

Fig. 15 is a view showing certain details of the same.

Figure 1:
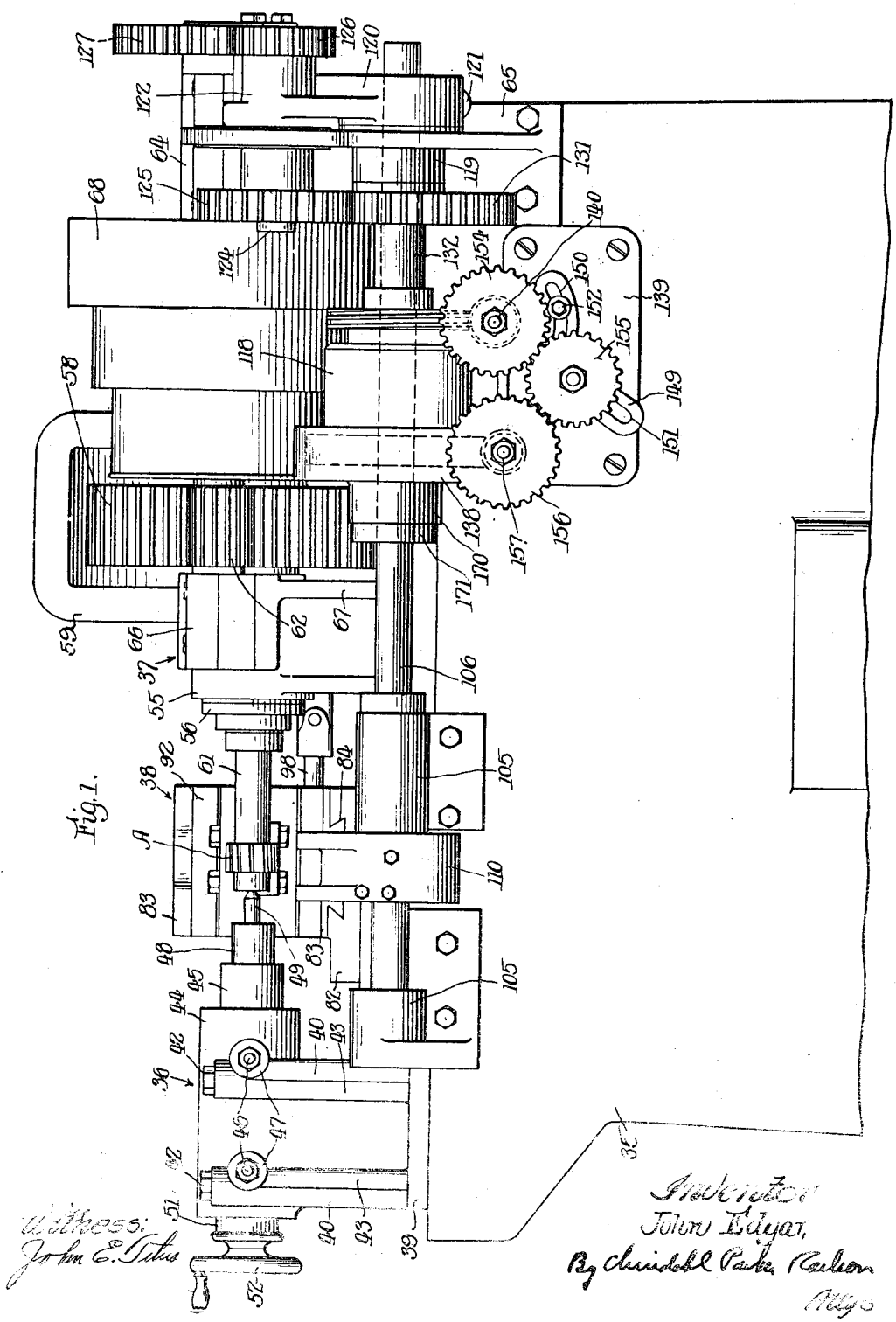
Figure 2:
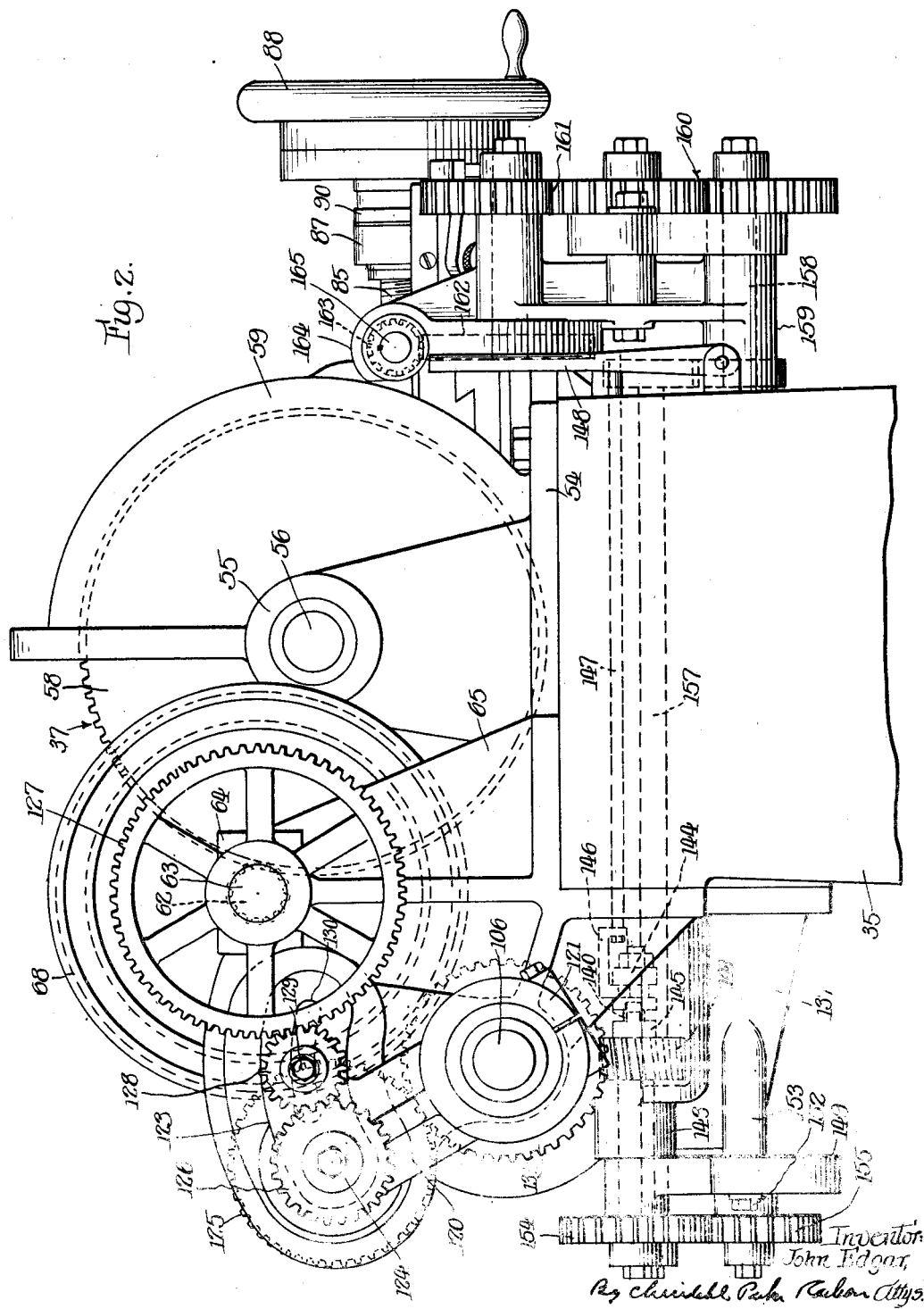
Fig. 2 is a left end view.
Figure 3:
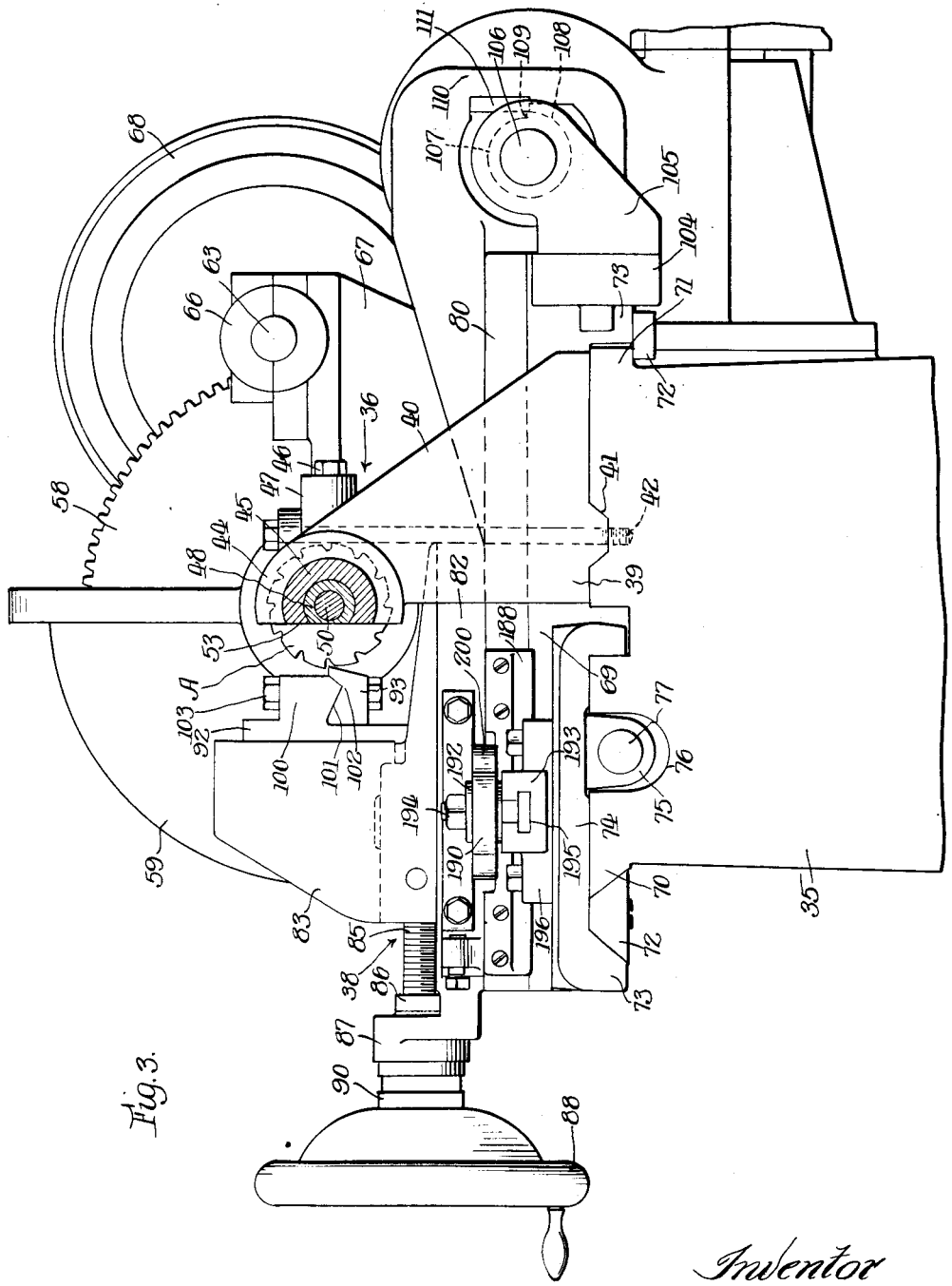
Fig. 3 is a right end view.

Figs. 16 to 19 inclusive are respectively a left end view, a front view, a right end view, and a fragmentary perspective view of a milling cutter blank which has been helically fluted preparatory to cutting and relieving the teeth on the machine illustrated in Figs. 1 to 15 inclusive.

Fig. 20 is a left end view, and Fig. 21 is a front view of the same milling cutter blank after the completion of the depth cut which is effected by the horizontal feeding movement of the lathe tool toward the blank.

Fig. 22 is a left end view, and Fig. 23 is a front view of the finished cutter.

Fig. 24 is a diagrammatic view illustrating the character of the relief of the teeth of the completed cutter.

Fig. 25 is a diagrammatic view illustrating the positions of different points along the cutting edge of the lathe tool relative to the blank at one stage of the operation.

Fig. 26 is a perspective view of one form of lathe tool before its cutting edge has been given the desired contour.

Fig. 27 is a fragmentary perspective view of the same tool after its cutting edge has been properly formed, the dotted lines illustrating the manner of laying out the contour.

Fig. 28 is a front end view of another form of lathe tool.

Fig. 29 is a plan view of the lathe tool shown in Fig. 28 and a preliminary tool for forming the same, and Fig. 30 is a side view thereof.

Fig. 31 is a plan view and Fig. 32 is a front end view of the preliminary forming tool shown in Figs. 29 and 30.

Fig. 33 is a diagrammatic end view of a milling cutter having undercut teeth.

Fig. 34 is a fragmentary side view of a preliminary forming tool for lathe tools adapted to relieve cutters with undercut teeth.

While my invention is susceptible of various modifications and alternative forms, I have shown in the drawings and will herein describe in detail the preferred embodiment thereof; but it is to be understood that I do not thereby intend to limit the invention to the particular form described but aim in the subjoined claims to cover all modifications and alternative forms falling within the spirit and scope of the invention.

Referring to the drawings, 35 represents a closed base upon which the other parts of the machine are mounted. These machine parts consist generally of a tail stock 36, a head stock 37, a cutting mechanism 38, and suitable power connections for operating them in proper relation.

The tail stock 36 (Figs. 1, 3 and 4) comprises an upstanding bracket 39, which preferably is angular in form with the two sides braced by a pair of spaced ribs 40. The bracket 39 is adjustable along a longitudinal way 41 on the base 35, and may be locked in any adjusted position by a pair of bolts 42 extending vertically through tubular enlargements 43 formed on the vertical side of said bracket between the ribs 40. Formed integral with the upper end of the bracket 39 is a horizontal sleeve or head 44, in which a tubular slide 45 is adjustably mounted. The slide 45 can be clamped in place by a pair of bolts 46 extending through tubular projections 47 on the bracket 39. A rod 48 with a center pin 49 in its forward end is slidably supported by the slide 45, and may be longitudinally adjusted by a screw 50 threaded into its rear end. The screw 50 is journaled in a bearing 51 on the slide 45, and can be rotated by a suitable hand wheel 52. Preferably the sleeve 44, slide 45, and rod 48 are cut away at one side, as indicated at 53.

The headstock 37, (Figs. 1 to 4), is mounted on the base 35 opposite the tailstock 36; and includes a main frame 54 bolted in place, and formed with suitable bearings 55 for supporting a work spindle 56. Bushings 57 are provided in the bearings 55, the front bushing being tapered to take up wear. Mounted on a tapered portion of the spindle 56 between the bearings 55 is a large drive gear 58 which is partially enclosed at the front of the machine by a housing 59 on the frame 54. At its front end, the spindle 56 is formed with a suitable slot 60 to provide a driving connection with an arbor 61 centered on the pin 49. This arbor 61 in the present instance is shown with a spiral gashed cutter blank A mounted thereon.

The gear 58 is driven by a small pinion 62 on a horizontal drive shaft 63. One end of this shaft is journaled in a bearing 64 on a change gear bracket 65 of irregular shape bolted to a corner of the machine base 35, and the other end is supported by a removable bearing 66 mounted on a rearward extension 67 of the frame 54. The shaft 63 is driven by a cone pulley 68 which is connected to any suitable source of power (not shown).

The cutting mechanism 38 includes a main carriage 69 (see Figs. 3 to 5) which is movable along longitudinal guides 70 and 71 on the upper side edges of the base 35. Gib plates 72 are removably secured to depending flanges 73 on the ends of the carriage 69, and underlie the guides 70 and 71. The carriage 69 is provided with a lateral extension 74 having a threaded lug 75 on its underside, said lug being movable in a channel 76 formed in the upper surface of the base 35. An adjusting screw 77 engages the lug 75, and can be rotated by turning a shaft 78 extending to the front of the machine.

Mounted in dove-tailed ways 79 on the carriage 69 for reciprocation laterally of the base 35 is a backing-off or relieving slide 80, (see Figs. 4 to 9). This slide is provided with transverse ways 81 for supporting a side relief slide 82. A tool slide 83 is positioned in longitudinal ways 84 on the slide 82, and is provided with a non-rotatable adjusting screw 85 rigidly secured to its front end. The forward end of the screw 85 is in threaded engagement with a nut 86 rotatably mounted in a bearing 87 on the front end of the slide 82. A hand wheel 88 formed integral with a sleeve 89 is keyed to the nut 86, and when rotated causes the slide 83 to be fed transversely of the base 35. The relative position of the slide 83 is indicated by a micrometer dial 90 secured to the sleeve 89.

The tool slide 83 (Figs. 6 and 7) is provided with vertical ways 91 along which a tool holder 92 carrying a suitable lathe tool 93 may be fed or adjusted. A vertical screw 94 is rotatably mounted in the base of the slide 83, and extends through a threaded sleeve 95 rigid in an inwardly extending lug 96 on the holder 92. At its lower end, the screw 94 is connected through a suitable train of gears 97 with a shaft 98 that extends laterally from the slide 83. The gear train 97 is preferably housed in a chamber 99 formed in the base of the slide 83.

The tool holder 92 may be of any suitable construction, and in the present instance is provided with a lateral projection 100 having an angular ridge 101 on its underside. This ridge is adapted to fit into a complementary depression 102 in the upper surfaces of the lathe tool 93 to correctly position and prevent displacement of the latter. Lathe tools 93 of different forms and sizes may be interchangeably clamped in place on the holder 92 by a pair of bolts 103 extending through the projection 100.

To provide means for reciprocating the backing-off slide 80 in timed relation to the rotation of the work blank A so as to give the lathe tool 93 a proper relieving movement, the carriage 69 is formed at its rear end with lateral arms 104 to which a pair of spaced bearings 105 are bolted, (Figs. 1 and 3 to 5). Mounted in the bearings 105 is a sectional cam shaft 106 which carries a cam 107 having a spiral working surface 108 terminating abruptly at 109. A head 110 formed on the rear end of the backing-off slide 80 is positioned between the bearings 105 and about the cam 107. The cam 107 is adapted to engage a cam block 111 of hardened material located in the rear wall of the head 110. To hold the block 111 resiliently against the surface 108 of the cam, the slide 80 is continually pressed forwardly by a heavy coil spring 112 (see Fig. 5). The rear end of the spring 112 fits over a pin 113 which is supported by a stop post 114 on the carriage 69. At its forward end, the spring 112 fits over a pin 115 on an adjusting screw 116 threaded into the front of the slide 80. The compression of the spring 112 may be adjusted by turning the screw 116, and then tightening a check nut 117 on the latter. It will be seen that as the cam 107 is rotated, the lathe tool 93 will periodically be advanced slowly but positively toward the axis of the blank A to relieve the teeth and then be resiliently retracted.

One end of the cam shaft 106 extends slidably through a differential casing 118 and through a bearing 119 formed in the bracket 65. (See Figs. 1 and 2.) Pivotally mounted on the bearing 119 is a change gear swing arm 120 which can be clamped in place by a split sleeve 121. At its upper end the arm 120 is provided with an elongated bearing 122 which extends slidably through a large arcuate slot 123 formed in the bracket 65 to allow angular adjustment of the arm 120. A short shaft 124 is mounted in the bearing 122, and supports a spur gear 125 at one end and a change gear 126 at the other end. The change gear 126 is connected to a large drive gear 127 on the power shaft 63 through an intermediate gear 128, the latter being supported by a stub shaft 129 adjustably mounted in an arcuate slot 130 in the arm 120. The gear 125 meshes with a spur gear 131 rigidly secured to a sleeve 132 rotatably mounted on the shaft 106. A bevel gear 133 (see Fig. 12) is formed integral with one end of the sleeve 132, and meshes with a pair of diametrically opposite bevel gears 134 rotatably mounted on studs 135 within the casing 118. The gears 134 mesh with another bevel gear 136 which is rotatably supported within the casing 118, and is splined to the shaft 106. It will be apparent from the above that the shaft 106 will be driven while in any longitudinal position of adjustment by the main power shaft 63, and that its speed relative to that of the arbor 61 can be varied by changing the gear connection.

Means is provided for slowly driving the shaft 98 to effect a gradual and continual feeding movement of the lathe tool 93 vertically in timed relation to the rotation of the work blank A. To this end, a large irregular bracket 137 having a gear housing 138 and a base plate 139 is secured to the rear side of the machine base 35. Loosely mounted on a stub shaft 140 within the housing 138 is a worm gear 141 which meshes with a worm 142 formed integral with the sleeve 132. The shaft 140 (see Fig. 2) is journaled in a bearing 143 formed on the bracket 137, and at its inner end carries a spline collar 144 adapted to engage with a clutch dog 145 on the gear 141. A fork 146 has a rotatable engagement with the collar 144, and is connected by a rod 147 to a lever 148 at the front of the machine whereby the gear 141 may be locked to the shaft 140.

An arm 149 having an arcuate slot 150 and a straight longitudinal slot 151 is pivotally mounted on the outer end of the shaft 140, and may be locked in different angular positions by a bolt 152 extending through the slot 150 into a tubular projection 153 on the bracket 137. Supported on the shaft 140 next to the arm 149 is a spur gear 154 in mesh with a change gear 155 adjustably mounted in the slot 151. A gear 155 engages a spur gear 156 mounted on a shaft 157 journaled in the bracket 137 and extending through the base 35 to the front of the machine.

Geared to the front end of the shaft 157 (see Figs. 2 and 4) is a stub shaft 158 which is journaled in a bracket 159 secured to the front of the base 35, and is connected through a train of speed change gears 160 with another stub shaft 161 also journaled in the bracket. Mounted on the shaft 161 is a spiral gear 162 meshing with a small spiral gear 163, both gears being supported within a housing 164 formed on the bracket 159. The gear 163 is splined on a horizontal shaft 165 which is connected to the shaft 98 by a flexible joint 166.

To advance the reciprocation of the backing-off slide 80 in timed relation to the rotation of the work blank A and the vertical feeding movement of the lathe tool 93 when relieving helical or inclined teeth, the differential housing 118 is formed integral with a worm gear 167 located within the gear housing 138 and meshing with a worm 168 on the shaft 157. The housing 118 is provided with a hub 169 which is journaled in a bearing 170 in the housing 138 and is held against endwise movement by a plate 171.

Means is provided for automatically feeding the tool slide 83 with the lathe tool 93 step by step toward the work blank A as the backing-off slide 80 is reciprocated. (See Figs. 8 to 11.) Secured to one side of the slide 82 is a plate 172 having a bearing surface 173 inclined tangentially with respect to the hand wheel 88, and having a limit lug 174 on its lower edge perpendicular to said surface. A bell crank lever 175 having a depending leg 176 and a horizontal leg 177 is pivotally mounted on the surface 173. A stop bolt 178 is adjustably threaded through the leg 176 and is adapted to engage the carriage 69 and oscillate the lever 175 at each reciprocation of the slide 80. The leg 177 carries a ball 179 which is slidably positioned within an open ended slot 180 in one end of the dog 181 normally resting on the lug 174. In its other end, the dog 181 is formed with a notch 182 having opposed tooth like projections 183 on its sides. These projections 183 fit over and as the dog 181 is oscillated upward by the ball 179 are adapted to firmly clamp or bite an annular flange 184 on a graduated ring 185 rotatably adjustable on the hand wheel 88. A pair of bolts 186 engaging an annular T slot 187 in the ring 185 can be tightened to clamp the latter rigidly to the hand wheel 88 when an automatic cross feed is desired.

In Figures 3 and 13 to 15 inclusive, I have shown an attachment mounted on the cutting mechanism 38 for automatically reciprocating the slide 82 in synchronism with the backing-off slide 80 to effect a slide relief. This attachment comprises a bracket 188 formed with a lateral V-shaped projection 189 and carried by the slide 80. Pivotally mounted for oscillation on the projection 189 is an elongated arm 190 having a longitudinal slot 191 extending substantially throughout its length. A guide 192 slidably engages the slot 191 and is adjustably clamped to a guide member 193 by a bolt 194 engaging a T-slot 195 in the latter. The member 193 is mounted on a bracket 196 tightly bolted to the lateral extension 74 of the carriage 69. At its pivoted end, the arm 190 is formed at opposite sides with a pair of apertured ears 197 adapted selectively to support a roller 198. The roller 198 is movable in a bearing slot 199 defined by the two separable parts of a bracket 200 positioned directly over the bracket 188 and secured to the side relief slide 82. It will be seen that as the slide 80 is reciprocated, the arm 190 will be oscillated, thereby moving the roller 198 against the sides of the slot 199 to reciprocate the slide 82, and that the degree of reciprocation of the slide 82 may be varied by adjusting the position of the nut 192 along the guide member 193. The direction of the side relief may be reversed by changing the roller 198 from one ear 197 to the other.

The operation of the machine can best be described in connection with the method employed in forming and relieving certain milling cutters.

While the invention may be used for relieving various types of milling cutters, it is primarily intended to be used in backing-off formed or contour cutters, that is, cutters shaped to cut a predetermined contour other than a straight line. In Figs. 16 to 23, I have illustrated a typical contour cutter A as it appears at different stages of the forming and relieving operation. The cutter A is provided with a plurality of generally longitudinal teeth 201 separated by grooves 202, the teeth and the grooves preferably being spaced uniformly. The grooves 202 can be of any usual or desired size and shape, as required by the character of the teeth 201, and may be cut in any suitable manner.

The teeth 201 are provided with front cutting faces 203 which are substantially radial to give a suitable rake, and which are inclined with respect to the longitudinal axis of the cutter A thus being helicoidal in shape. The degree and direction of inclination can be varied to suit any immediate practical need. Any suitable contour can be given the teeth 201, the contour in the present instance being that of a thread mill, and hence being composed of a plurality of alternate points 204 and depressions 205 connected by relatively inclined lines 206.

The teeth 201 are relieved along lines 207 extending backward and inwardly, each preferably conforming to an Archimedean spiral. When the cutter is so relieved the shape of each tooth is distorted in a longitudinal radial plane of intersection; but the distortion is the same in all similar planes. The effective cutting contour 208 is the same in successive helicoidal surfaces, such as 209 and 210, of like inclination, and is therefore unchanged by grinding the faces 203 to sharpen the cutter A.

The cutter blank A can be relieved by the lathe tool 93, shown in Figs. 26 and 27 as it appears before and after its contour has been formed. The dotted lines 211 represent a rectangular block 212 from which the tool 93 is developed. As shown, the tool 93 is formed with a cutting face 213 which is inclined laterally or downwardly from one side to the other, the angle of inclination preferably being the same as that of the cutter teeth 201 and the direction of inclination being reversed for tools adapted to relieve right hand and left hand gashed cutters. The cutting face 213 is provided with a cutting edge 214 having a contour composed of a plurality of teeth 215. These teeth are relieved along lines 216 and comprise crests 217 and roots 218 connected by inclined sides 219. Due to the inclination of the cutting face 213, the cutting edge 214 of the teeth 215 is somewhat distorted, but its projection 220 represented in dotted lines on the upper edge of the block 212 corresponds substantially with the predetermined contour to be cut by the cutter A. The teeth of the lathe tool 93 can be cut by a preliminary forming tool (not herein shown) having a complementary contour and moving in the direction of the lines of relief.

In Figs. 28 to 30 is shown another form of lathe tool 93$^a$, the cutting edge 214 of which has a contour composed of two straight lines 221 joined by a circular arc 222. A preliminary forming tool 223 more fully illustrated in Figs. 31 and 32, and having a complementary contour 224 and a laterally inclined cutting face 225, is shown in cutting position, the direction of movement being indicated by dotted relief lines 226 in Fig. 30.

In the operation of relieving the milling cutter the lathe tool 93 is initially so positioned that the uppermost point of contour 214, indicated at $a$, is in a horizontal plane passing through the axis of the cutter A and through the extreme end $a'$ of one of the cutting faces 203. Upon connecting the power, the cutter blank A and the cam 107 are rotated in timed relation, the cam acting to reciprocate the lathe tool 93 as many times during one revolution of the blank as the latter has teeth. The reciprocation is so timed that the inward movement of the point $a$ begins exactly when it is in horizontal alinement with $a$. Preferably the cam 107 is so shaped that the relief lines 207 generated by the movements of the lathe tool 93 are Archimedean spirals. The lathe tool 93 is gradually fed in successive steps at each reciprocation thereof toward the rotating blank A, this automatic cross feed being instituted at the beginning of the operation by clamping the ring 185 to the hand wheel 88, and continuing until the full depth of the milling cutter tooth has been attained, i. e. until the point $a$ contacts with the point $a'$. The cut thus far taken may be called the "depth cut", and leaves the blank A appearing as illustrated in Fig. 21 with only point $a'$ of the contour completely relieved.

After the "depth cut", the differential feed for the cam 107 and the upward feed for the lathe tool 93 are instituted by operating the lever 148. As the tool 93 is raised, the point of the cutting edge 214 in the horizontal plane of the cutter axis, which may be termed the "effective cutting point," moves gradually and continually to the left along the teeth 201. The reciprocation of the lathe tool 93 is gradually advanced by the differential feed relative to the rotation of the cutter blank A at a rate directly proportional to that at which the "effective cutting point" moves along the cutting edge 214, and also bearing a definite relation to the inclination of the teeth 201, so that as the "effective cutting point" proceeds from right to left, it always begins its relieving movement exactly at the cutting face 203 of each tooth regardless of the inclination of the latter. The cut from right to left, which is obtained by feeding the tool 93 vertically, may appropriately be termed the "forming cut."

When relieving one tooth 201, no interference with the cutting edge of the succeeding tooth or the back of the preceding tooth results to cause mutilation thereof. As the "forming cut" proceeds, the successive horizontal elements along the cutting face 213 of the lathe tool 93 pass from below the horizontal plane of the cutter A to above the same. This is illustrated in Fig. 25 wherein $b$, $b'$ and $b''$ are sections of the lathe tool 93 taken respectively along lines $b—b$, $b'—b'$ and $b''—b''$ in Fig. 27. The dotted lines $c$, $c'$ and $c''$ indicate respectively the innermost position of these sections. It will be seen that due to the inclination of the cutting face 213, and the curvature of the blank A the latter recedes from the lathe tool 93 above and below the "effective cutting point" ($b'$ in Fig. 25), whereby the parts of the cutting edge 214 remote from the "effective cutting point" ($b$ and $b''$ in Fig. 25) barely if at all engage the blank A in their innermost positions of reciprocation. The parts adjacent the "effective cutting point" when emerging from the tooth 201 will not engage the following tooth due to the clearance provided by the groove 202. Furthermore in the preferred embodiment wherein the degree of inclination of the cutting faces 203 and 213 is substantially identical, the cutting edge 214 directly before entering or after emerging from any tooth 201 will be positioned in line with a groove 202, thereby positively avoiding contact with the adjacent teeth. This results regardless of whether the teeth 201 are short or overlap. Obviously the inclination of the cutting face 213 can be varied to suit different cutter tooth angles.

Where cutters, such as the one illustrated in Fig. 33, having teeth with undercut cutting faces 227 are to be relieved, the lathe tool is formed by a special tool 228 which is similar to the preliminary forming tool 223 except in that its cutting face 229 is inclined downwardly, forwardly along line 230 as well as laterally. The forward inclination in degrees is relative to the undercut, and is determined by a proper consideration of elements in design of both cutter and tool. The tan of the angle of inclination may be expressed by the formula:

$$\tan = \frac{\tan \text{ of undercut} \times N \times \text{cam}}{\tan C \times \text{circumference}}$$

wherein
N = Number of gashes in cutter.
Cam = Relief given each tooth, and equals the amount of reciprocation of tool.
C = Clearance angle of tool, i. e. the angle of the relief lines 226 with perpendiculars through the base.

This inclination results in the formation of a distorted contour on the lathe tool which, however, is adapted to provide the cutter with the desired contour.

If the cutting edge 208 is perpendicular or sharply inclined to the longitudinal axis of the cutter A, a rectangular relief is often inadequate, and a side relief should be provided in addition thereto. This can be accomplished by means of the attachment specially illustrated in Figs. 13 to 15 which is operated by the reciprocating slide 80 to reciprocate the slide 82 in synchronism, whereby the lathe tool 92 is given a composite movement inclined with respect to the axis of the cutter blank A. This lateral reciprocation of the tool 93 does not alter the method herein disclosed, nor the general character and properties of the cutter.

It will be apparent from the foregoing description that I have provided a novel and advantageous method of and machine for relieving spiral gashed formed milling cutters. The machine is sturdy and simple in construction and readily adjustable to relieve many different kinds of milling cutters, while the method is extremely simple, accurate and efficient. Although the invention satisfies a pressing need for means whereby spiral gashed formed cutters may be made, it can be used with equal facility for making other types, and is therefore not intended to be limited in use to any specific form of cutter.

I claim as my invention:

1. A metal cutting machine having, in combination, the means for rotating a blank having inclined blades, a cutting tool substantially coextensive in length with the blades and having an inclined cutting face, means for gradually feeding the tool into the blank as the latter is rotated, means for feeding the tool in a direction perpendicular to said last mentioned feeding movement and transversely of said blank to move successive points along the cutting edge successively into cutting position along said blank, means for effecting relative reciprocatory movement between the tool and blank in timed relation to the rotation of said blank, and means for varying said reciprocatory movement during the last mentioned feeding movement in timed relation to said second feeding movement.

2. A machine tool having, in combination, means for rotating a work blank having inclined blades, a cutting tool having an inclined cutting face, means for effecting a relative reciprocatory movement between said cutting tool and said blank, means for feeding said cutting tool first horizontally into the blank and then vertically, and means for varying said reciprocation during the vertical feeding movement.

3. A metal cutting machine having, in combination, means for rotating a work blank, a cutting tool having an inclined cutting face, a single power means for rotating said spindle and for effecting a relative reciprocatory movement between the blank and the tool, means for automatically advancing the tool toward and into the blank, and means for feeding said tool at right angles to said last mentioned movement and transversely of said blank to move successive points along the cutting edge of said face through the effective cutting plane.

4. A metal cutting machine having, in combination, means for rotating a work blank having spiral gashes, a cutting tool having a contour adapted to cut a predetermined contour on the blank, the cutting face being inclined from a horizontal plane longitudinally of said blank, means for reciprocating said cutting tool as said blank is rotated to provide relief, means for gradually feeding said cutting tool horizontally toward said blank to provide the proper cutting depth, means for feeding said cutting tool vertically to provide the predetermined contour, and means for advancing or retarding the reciprocation of said cutting tool relative to the rotation of said blank during the vertical feeding movement to compensate for the inclination of said gashes.

5. A metal cutting machine having, in combination, means for rotating a work blank having spiral gashes, a cutting tool having a contour adapted to cut a predetermined contour on said blank, the cutting edge being inclined longitudinally of said blank, means for reciprocating said cutting tool continuously relative to said blank to provide relieving movements, means for gradually advancing said cutting tool toward and into said blank, to obtain cutting depth, means for feeding and cutting tool perpendicularly to said last mentioned feeding movement and to said plane to provide said blank with the predetermined contour, means for varying the reciprocation of said cutting tool relative to the rotation of said blank and in timed relation to said perpendicular feeding movement, and means for simultaneously rendering said last two means operative.

6. A metal cutting machine having, in combination, means for rotating a work blank having inclined blades, a reciprocatory slide, means for reciprocating said slide transversely of said blank, a tool slide adjustably mounted on said reciprocatory slide, a cutting tool carried by said tool slide and having a cutting face longitudinally inclined to a horizontal plane, means for actuating said reciprocatory slide, means for feeding said tool slide toward said blank, means for feeding said tool vertically on said tool slide, said means including a differential mechanism automatically operable to advance the reciprocation of said reciprocatory slide as said tool is fed vertically.

7. A metal cutting machine having, in combination, a means for rotating a work blank, a cutting tool having a longitudinally inclined cutting face, means for periodically effecting a relative perpendicular reciprocatory relieving movement between said tool and said blank, means for effecting a relative reciprocatory movement between said cutting tool and said blank longitudinally of said blank in synchronism to said first mentioned reciprocatory movement, said reciprocatory movements toward and longitudinally of said blank resulting in a composite movement oblique to said blank, and means for successively feeding said tool gradually in two perpendicular directions transversely of said blank to provide the predetermined contour, one of said movements being perpendicular to the plane to which said face is inclined.

8. A machine for forming and relieving formed cutters having, in combination, means for rotating a blank, a cutting tool having an inclined cutting face, and means for feeding said tool successively in two perpendicular directions transversely of the blank, the first movement being into the blank to provide depth and the second movement serving to provide form and to move successive points along the cutting edge of said face through the effective cutting plane.

9. A metal cutting machine having, in combination, means for rotating a work blank having spiral gashes, a cutting tool shaped to cut a predetermined contour on said blank and having a cutting face inclined to a plane through the axis of the blank, means for effecting a relative reciprocation between said blank and said lathe tool to provide relieving movements, means for feeding said tool successively in two perpendicular directions transversely of said blank to cut said predetermined contour, the last of said movements being perpendicular to said last mentioned plane, and means for relatively advancing or retarding said reciprocation between said tool and said blank to compensate for the inclination of said gashes.

10. A metal cutting machine having, in combination, means including a spindle for rotating a work blank having inclined blades, a slide mounted for reciprocation transversely of said spindle, a cam mechanism for periodically reciprocating said slide, a cutting tool mounted on said slide and having a cutting face inclined to a horizontal plane, automatic means for feeding said cutting tool toward said blank, and means for feeding said cutting tool vertically, said last mentioned means including a differential mechanism operatively connected with said cam mechanism to vary the reciprocation of said slide relative to the rotation of said blank as said cutting tool is fed vertically.

11. A metal cutting machine having, in combination, means for rotating a work blank, a support, a slide mounted on said support for reciprocation transversely of said blank, drive means for reciprocating said slide and rotating said first mentioned means, a tool slide adjustably mounted on said first mentioned slide, a cutting tool on said tool slide, a bell crank lever pivotally mounted on said first mentioned slide, one arm of said lever constituting an abutment adapted to engage said support upon each reciprocation of said first mentioned slide to oscillate said lever, and means automatically operable through oscillation of the other arm of said lever to effect an incremental feed of said tool slide and cutting tool toward said work blank.

12. A metal cutting machine having, in combination, means for rotating a work blank, a slide mounted for reciprocation transversely of said blank, a side relief slide mounted for reciprocation laterally of said first mentioned slide and longitudinally of said blank, a tool slide adjustably mounted on said side relief slide for movement toward and from said work blank, a cutting tool on said tool slide, means operable by the reciprocation of said first mentioned slide for synchronously reciprocating said side relief slide, and means operable by the reciprocation of said first mentioned slide for automatically feeding said tool slide toward said blank.

13. A metal cutting machine having, in combination, means for rotating a work blank, a slide mounted for reciprocation transversely of said blank, a side relief slide mounted for reciprocation laterally of said first mentioned slide, a tool slide mounted for adjustment toward and from said blank, and automatic means actuated through the reciprocation of said first mentioned slide for synchronously reciprocating said side relief slide and for feeding said tool slide progressively toward said blank.

14. A metal cutting machine having, in combination, means for rotating a work blank, a cutting tool having a cutting face longitudinally inclined to a horizontal plane, means for effecting periodical relieving movements of said cutting tool toward said blank, means for feeding said tool progressively toward said blank, and means for feeding said tool vertically and transversely of said blank, to provide depth and form respectively.

15. A metal cutting machine having, in combination, a base, a means for rotating a work blank having spiral gashes, a cutting tool substantially coextensive in length with the area to be cut, power means for rotating said first mentioned means and for reciprocating said cutting tool relative to said blank, means for effecting a feeding movement of said tool first to provide cutting depth and then to form the blank, and means for advancing or retarding said reciprocation during the forming cut.

16. A metal cutting machine having, in combination, a base, a means for rotating a work blank, a carriage slidable longitudinally on said base, a relieving slide mounted for reciprocation transversely on said carriage, a cutting tool mounted on said slide and having a cutting face longitudinally inclined to a plane through the axis of the blank, spring means for moving said cutting tool away from said blank, a cam drive for periodically moving said tool toward said blank, and means for feeding said tool in two directions in a plane transverse to said blank, one feeding movement providing depth of cut and the other feeding movement being substantially perpendicular to said first mentioned feeding movement.

17. A metal cutting machine having, in combination, a base, a carriage longitudinally slidable on said base, a relieving slide mounted for reciprocation transversely on said carriage, a tool slide adjustably mounted on said relieving slide, a tool holder vertically adjustable on said tool slide, a cutting tool on said tool holder having a cutting face inclined to the horizontal, means for rotating a work blank having spiral gashes, means for reciprocating said relieving slide in timed relation to the rotation of said blank, means for feeding said tool slide toward and from said blank, and means for feeding said tool holder vertically and advancing the reciprocation of said relieving slide in timed relation thereto.

18. A metal cutting machine having, in combination, a base, means for rotating a work blank having spiral gashes, a cutting tool movably mounted on said base, said cutting tool being provided with a horizontally inclined cutting face, means for effecting a relative reciprocation between said blank and said tool, means for feeding said cutting tool into said blank, means for feeding said cutting tool vertically to bring successive points along said cutting face into cutting position, and means for varying the relative reciprocation between said tool and said blank in timed relation to the rate at which cutting proceeds longitudinally of the blank.

19. A metal cutting machine having, in combination, a base, means for rotating a work blank having inclined blades with undercut cutting faces, a cutting tool movably mounted on said base and having a cutting face inclined laterally and longitudinally to a horizontal plane, the contour of said face being other than a straight line, means for effecting a relative reciprocation between said blank and said tool, and means for feeding said tool into the blank, means for effecting a vertical movement of said tool and for varying said reciprocation in timed relation to and during said vertical movement.

20. The method of cutting spiral gashed cutters comprising, rotating the blank, providing a cutting tool having a cutting edge adapted to cut a predetermined contour on said blank, effecting a relative reciprocation between said tool and said blank in timed relation to the rotation to the latter, feeding said cutting tool gradually and progressively into said blank until the desired cutting depth is obtained, feeding said tool perpendicularly to said last line of movement and transversely of said blank to cut the predetermined contour, and varying the reciprocation of said tool relative to the rotation of said blank in timed relation to said perpendicular feeding movement.

21. The method of cutting spiral gashed cutters comprising, rotating the cutter blank having inclined gashes, providing a cutting tool having a cutting face laterally inclined and provided with a cutting contour adapted to cut a predetermined contour, effecting a relative reciprocation between said tool and said blank in timed relation to the rotation of the latter, locating the effective uppermost point of said cutting contour in a plane passing substantially through the axis of said cutter, feeding said cutting tool in said plane toward said blank, feeding said cutting tool in a direction perpendicular to said last feeding movement and transversely of said blank to bring successive parts of said cutting contour progressively into cutting position longitudinally of said blank, and varying said reciprocation in timed relation to the last feeding movement to compensate for the inclination of said gashes.

22. The method of cutting gashed cutters comprising, rotating the cutter blank, providing a cutting tool having a cutting face inclined from one side to the other, effecting a relative reciprocation between said tool and said blank in timed relation to the rotation of the latter, and feeding said cutting tool successively in two directions perpendicular to the axis of said cutter blank to bring successive points along said cutting face progressively into cutting engagement longitudinally of said blank.

23. The method of cutting spiral gashed cutters having blades with undercut cutting faces comprising, rotating the blank, providing a cutting tool having a cutting face inclined laterally and longitudinally to a plane through the axis of the blank, effecting a relative reciprocation between said tool and said blank, and effecting a feeding movement of said tool successively in two mutually perpendicular directions transversely of said blank to cause the effective cutting point of said tool to move longitudinally of said blank.

24. The method of cutting milling cutters comprising, rotating the blank, providing a cutting tool having a suitable cutting edge inclined to a plane through the axis of the blank, effecting a relative reciprocation between said tool and said blank transversely of said blank in said plane, feeding said tool in said plane toward said blank to effect a depth cut, and feeding said tool perpendicularly to said plane to effect a forming cut.

25. A metal cutting machine having, in combination, means for rotating a work blank, a slide mounted for reciprocation transversely of said blank, a side relief slide mounted for reciprocation laterally of said first mentioned slide and longitudinally of said blank, a tool slide adjustably mounted on said side relief slide for movement toward and from said blank, a cutting tool on said tool slide, and means operable by the reciprocation of said first mentioned slide for synchronously reciprocating said side relief slide.

26. The method of relieving the teeth of a cutter having cutting faces longitudinally inclined to the axis of the cutter, which consists in backing off the teeth with a tool, the cutting edge of which is passed progressively through the cutting plane to bring different portions of its edge successively into action during the relieving operation and traces therein a contour corresponding substantially to the contour traced therein by the cutting edges of the cutter.

27. The method of relieving the teeth of a cutter having cutting faces longitudinally inclined to the axis of the cutter, which consists in backing off said teeth by relative backing-off movements between the rotating cutter and a tool having a cutting face longitudinally inclined to the axis of the cutter and having a cutting edge which is progressively brought into cutting relation with the cutter teeth by relative tangential movement between the cutter and tool and the contour of which is approximately a perpendicular projection from a radial plane normal to said tangential movement of the contour to be cut by the cutter.

28. A machine for relieving the teeth of cutters having cutting faces longitudinally inclined to the axis of the cutter having, in combination, cutter rotating mechanism, a tool having a cutting edge longitudinally inclined to the axis of the cutter, means for relatively moving the cutter and tool transversely of the cutter axis to back-off the teeth, and means for relatively moving the cutter and tool tangentially of the cutter at the cutting point.

29. A machine for relieving the teeth of cutters having cutting faces longitudinally inclined to the axis of the cutter having, in combination, cutter rotating mechanism, a tool having a cutting face longitudinally inclined to the axis of the cutter and having a cutting edge shaped to trace in the cutting plane a contour corresponding substantially to the contour traced therein by the cutting edges of the cutter, means for relatively moving the tool and cutter transversely of said axis during the passage of each tooth through the cutting plane, and means for passing the tool edge progressively through the cutting plane to transfer the point of operation on the cutter along said edge.

30. A machine for relieving the teeth of cutters having cutting faces longitudinally inclined to the axis of the cutter having, in combination, cutter rotating mechanism, a tool having a cutting face longitudinally inclined to the axis of the cutter and having a cutting edge shaped to trace in the cutting plane a contour corresponding substantially to the contour traced therein by the cutting edges of the cutter, a vertically movable tool holder, a transversely movable carrier for the tool holder, a backing-off cam for reciprocating the carrier driven from the cutter rotating mechanism, feed mechanism for moving the tool holder vertically, and differential gearing driven from the feed mechanism for varying the timing of the cam.

31. The method of relieving the teeth of a cutter having cutting faces longitudinally inclined to the axis of the cutter, which consists in rotating the cutter about its axis, acting thereon with a cutting edge longitudinally inclined to said axis, giving said cutter and cutting edge relative backing-off movements transversely of said axis and also a relative tangential movement to transfer the point of operation on the cutter along the edge and longitudinally of the cutter.

32. The method of relieving the teeth of a cutter having cutting faces longitudinally inclined to the axis of the cutter, which consists in rotating the cutter about its axis, acting thereon with a cutting edge longitudinally inclined to said axis, giving said cutter and cutting edge relative backing-off movements transversely of said axis and also a relative tangential movement to transfer the point of operation on the cutter along the edge and longitudinally of the cutter, and maintaining the timed relation between the backing-off movements and the teeth of the cutter as the point of operation progresses along the tool edge.

33. The method of relieving the teeth of a cutter having cutting faces longitudinally inclined to the axis of the cutter, which consists in rotating the cutter about its axis, providing a backing-off tool having a cutting face longitudinally inclined to the axis of the cutter and having a cutting edge shaped to trace in the cutting plane a contour corresponding substantially to the contour traced therein by the cutting edges of the cutter, relatively moving the cutter and tool transversely of said axis during the passage of each tooth through the cutting plane, and passing said edge progressively through the cutting plane to transfer the point of operation on the cutter along said edge.

34. The method of relieving the teeth of a cutter having cutting faces longitudinally inclined to the axis of the cutter, which consists in rotating the cutter about its axis, providing a backing-off tool having a cutting face longitudinally inclined to the axis of the cutter and having a cutting edge shaped to trace in the cutting plane a contour corresponding substantially to the contour traced therein by the cutting edges of the cutter, relatively moving the cutter and tool transversely of said axis during the passage of each tooth through the cutting plane, passing said edge progressively through the cutting plane to transfer the point of operation on the cutter along said edge, and varying said transverse movement with relation to the rotation of the cutter to keep them in time with the cutter teeth as the point of operation progresses along the tool edge.

35. The method of relieving the teeth of a cutter having cutting faces longitudinally inclined to the axis of the cutter, which consists in rotating the cutter about its axis, providing a backing-off tool having a cutting face longitudinally inclined to the axis of the cutter, and having a cutting edge which is approximately a vertical projection from the cutting plane of the contour traced therein by the cutting edges of the cutter, imparting horizontal backing-off movements to the tool, and moving the tool vertically to pass its edge progressively through the cutting plane.

36. The method of relieving the teeth of a cutter having cutting faces longitudinally inclined to the axis of the cutter, which consists in rotating the cutter about its axis, providing a backing-off tool having a cutting face longitudinally inclined to the axis of the cutter, and having a cutting edge which is approximately a vertical projection from the cutting plane of the contour traced therein by the cutting edges of the cutter, imparting horizontal backing-off movements to the tool, moving the tool vertically to pass its edge progressively through the cutting plane, and maintaining the timed relation between the backing-off movements and the cutter teeth as the tool moves vertically.

37. A machine for relieving the teeth of cutters having cutting faces longitudinally inclined to the axis of the cutter having, in combination, cutter rotating mechanism, a tool having a cutting edge longitudinally inclined to the axis of the cutter, means for effecting relative backing-off movements between the tool and cutter, and means for relatively moving the cutter and tool to bring different portions of the tool edge progressively into cutting relation to the cutter teeth.

38. A machine for relieving the teeth of cutters having cutting faces longitudinally inclined to the axis of the cutter having, in combination, cutter rotating mechanism, a tool having a cutting edge longitudinally inclined to the axis of the cutter, means for effecting relative backing-off movements between the tool and cutter, means for relatively moving the cutter and tool to bring the tool edge progressively into cutting relation to the cutter teeth, and means for maintaining the timed relation between the backing-off movements and the teeth of the cutter.

39. A machine for relieving the teeth of cutters having cutting faces longitudinally inclined to the axis of the cutter having, in combination, cutter rotating mechanism, a tool having a cutting edge longitudinally inclined to the axis of the cutter, means for relatively moving the cutter and tool transversely of and either normal to or at an inclination to the cutter axis to back off the teeth, and means for relatively moving the cutter and tool tangentially of the cutter at the cutting point.

40. A machine for relieving the teeth of cutters having cutting faces longitudinally inclined to the axis of the cutter having, in combination, cutter rotating mechanism, a tool having a cutting edge longitudinally inclined to the axis of the cutter, means for relatively moving the tool and cutter in the cutting plane during the travel of each cutter tooth therethrough, and means for passing successive portions of the tool edge progressively through the cutting plane.

41. A machine for relieving the teeth of cutters having cutting faces longitudinally inclined to the axis of the cutter having, in combination, cutter rotating mechanism, a tool holder, a backing-off cam for advancing and retracting the tool holder, gearing between the cutter rotating mechanism and cam for giving said cam as many revolutions during one revolution of the cutter as there are teeth in the cutter, feed mechanism for vertically feeding the tool holder, and differential gearing between the feed mechanism and backing-off cam for varying the timing of the cam.

In testimony whereof, I have hereunto affixed my signature.

JOHN EDGAR.